United States Patent Office 3,437,515
Patented Apr. 8, 1969

3,437,515
METHOD OF COATING SURFACES WITH HIGH INDEX OXIDES
Charles A. Quinn, Yorktown Heights, Carl J. Rieger, Ossining, and René A. Bolomey, Peekskill, N.Y., assignors to The Mearl Corporation, Ossining, N.Y., a corporation of New Jersey
No Drawing. Continuation-in-part of application Ser. No. 348,855, Mar. 2, 1964. This application Jan. 11, 1965, Ser. No. 424,832
Int. Cl. C03c 25/02
U.S. Cl. 117—100                    12 Claims

ABSTRACT OF THE DISCLOSURE

A novel method is provided for depositing films of oxides of various metals on surfaces. More particularly, the method is applied to the deposition of oxides having a high refractive index upon particles which may then be utilized in products exhibiting nacreous or color effects upon reflection and transmission of light. The method involves the deposition of such materials from hydrogen peroxide complexes of the respective metals.

---

This application is a continuation-in-part of application Ser. No. 348,855, filed on Mar. 2, 1964, and assigned to the assignee of the present invention now abandoned.

This invention relates to a method for depositing films of oxides of various metals on surfaces and more particularly to such a method for forming light-reflecting products which exhibit nacreous or color producing effects upon reflectance and transmission of light therethrough.

In the following specification all parts and percentages are given by weight unless otherwise indicated.

The method is applicable to those metals which form complexes in solution with hydrogen peroxide, and is of particular interest where the hydrolyzed product is deposited as a thin film of the corresponding metal oxide having a high index of refraction. The method is highly useful for the deposition of oxides of titanium, zirconium, cerium, molybdenum, and vanadium.

The dioxides of titanium, zirconium, and cerium, and the trioxide of molybdenum are desirable components of products whose function it is to reflect light, because of their high index of refraction. Such light-reflecting products include those with relatively large reflecting surfaces, like mirrors and parabolic lamp reflectors, and reflectors in which the individual particles may be quite small, such as glass platelets, mica flakes, glass spheres, ceramic articles, plastic particles, and lacquer, or resin-coated particles. These surfaces or particles may range downward in size to the dimensions of pigment particles, which are often less than one micron in size.

Reflective surfaces may be used in increasing the efficiency of lamps, in the manufacture of road signs which are to be illuminated by automobile headlights, in polarizers, iridescent coatings, and in nacreous or pearlescent decorative pigments.

It is known to coat titanium dioxide or other metal oxides having relatively high reflective indices on the surface of, for example, mica flakes by hydrolysis procedures. Although such methods are effective to form thin metal oxide films, they do not produce high quality film having the greater thicknesses which as indicated hereinafter are necessary to produce certain colors by optical interference effects.

When hydrated titanium dioxide is deposited on a particulate substrate such as mica flakes, the relatively poorly reflecting mica flakes increase in reflectivity. The coating is initially of relatively low index of refraction because of the high degree of hydration of the metal oxide. The coating may however be dehydrated and crystallized by heating the coated particles, the heating temperature determining whether an amorphous film is obtained or whether the coating is converted to a crystalline form such as anatase or rutile in the case of a hydrated titanium dioxide. The thickness and index of refraction of such a film is dependent on the crystalline state of the metal oxide and the degree of packing of the crystallites as well as on the quantity of the metal oxide deposited.

It is known that mica flakes of suitable size, preferably between about 325 to 160 mesh, when coated with $TiO_2$, acquire some of the properties of pearlescent pigments. Such pigments contain thin plate-like particles having a high index of refraction. They impart a nacreous, pearlescent, or mother-of-pearl-like effect to surfaces on which they are coated, and also give a mother-of-pearl appearance to plastics in which they are incorporated. The specific characteristics depend on, among other factors, the thickness of the platelet. The thin films of $TiO_2$ applied to mica flakes behave like nacreous pigment platelets.

A thin film of $TiO_2$ produces a bluish or whitish reflection. When the thin film of $TiO_2$ is slightly thicker, the rays reflected from its two surfaces may interact, resulting in the reinforcement or destruction of light of certain wavelengths, as described in detail in U.S. Patents Nos. 3,123,485, issued on Mar. 3, 1964, 3,123,489, issued Mar. 3, 1964, and U.S. application Ser. No. 171,734, filed on Feb. 7, 1962, owned by applicants' assignee. Thus the flakes can appear colored when they are illuminated with white light.

Destructive interference of a given wavelength occurs if the reflections from the two surfaces of the film are completely out of phase. This occurs, for light perpendicularly incident on the film, for wavelength $\lambda$ when $$Nd = (n-1)\lambda/2 \qquad (1)$$

where

N is the index of refraction of the film,
$d$ is its thickness, and
$n$ is a small integer, e.g., 1, 2, 3 …

If the incident light is monochromatic and of wavelength $\lambda$, this well-known equation predicts that there would be no reflection at all. If on the other hand the film is illuminated by white light, all wavelengths except $\lambda$ appear in the reflection.

Reinforcement of a given wavelength occurs if the reflections from the two surfaces of the film are in phase with one another. For light perpendicularly incident on the film, this occurs when $$Nd = (2n-1)\lambda/4 \qquad (2)$$

the terms being defined as above.

If N is taken as 2.5 and $n$ as 2, the smallest film thickness which can produce color by destructive interference is that which will cause the shortest wavelength in the visible spectrum, i.e., violet blue, to be eliminated from the reflected light. Taking $\lambda$ for light of this color as 400 m$\mu$, the thickness of film necessary to produce this effect is approximately 80 m$\mu$.

The resulting reflected light has the color complementary to that which is eliminated from the reflection, or yellow in the present instance. Thus, the thinnest film capable of producing a color by destructive interference has a yellow reflection color. Films which reflect red, violet, blue, and green, are progressively thicker. Beginning at violet, the reflection color which is produced by the elimination of a particular wavelength is enhanced by a reinforcement color in accordance with Equation 2.

The approximate thickness necessary to produce each reflection color is shown in the following table.

| Reflection color | Source | Approx. optical thickness, Nd (mu) | Approx. thickness (mu) if N=2.5 |
|---|---|---|---|
| Yellow | Elimination of violet-blue, approx. 400 mu. | 200 | 80 |
| Magenta | Elimination of green, approx. 520 mu. | 260 | 104 |
| Purple | Elimination of yellow, 590 mu; reinforcement of violet, 400 mu. | 300 | 120 |
| Blue | Elimination of orange, 610 mu; reinforcement of blue, 480 mu. | 320 | 132 |
| Green | Elimination of red, 650 mu; reinforcement of green, 520 mu. | 360 | 144 |

Titanium dioxide films having greater thicknesses, beyond an approximate optical thickness of 360 mµ, produce a repeated optical spectrum commencing with the reflection of yellow light. The description second yellow, second red, or the like, is used herein to describe the second occurrence with increasing thickness with each of the optical interference colors. The usual definition of higher order interference colors by order number is not always consistent with the value of $n$ in interference Equations 1 and 2 above, $n$ also occasionally being referred to as order. Hence, the nomenclature given above has been here employed instead.

The main defect, which may be seen after crystallization of $TiO_2$ films on mica, is "crazing" which is the breaking of the coating into islands separated by cracks where there is no coating or a thinner coating. This defect may be detected on microscopic examination by reflected light at 1000×. The valleys or craze lines cause the scattering of light, with a diminution of nacreous luster and, in the case of color-producing films, a diminution of color intensity. Furthermore, if the coated mica flakes are used in a surface coating to impart a colored, nacreous effect, the scattering of light detracts from the luster and gloss as well as from the color.

Even more serious, there is a danger of stripping of the $TiO_2$ coating from the mica flake if the flake is subjected to a rigorous mechanical treatment, as occurs when such flakes are incorporated in thermoplastic resins for the production of colored, nacreous effects. Individual islands may be lifted off the mica flake in the course of such incorporation, an occurrence which is avoided if there are no islands because there are no craze lines.

Previously known procedures, such as a titanium sulfate-sulfuric acid coating method, can produce a yellow-reflecting, crystallized film without significant crazing. When the method is used to deposit a thicker coating, such as is required to produce magenta, purple, blue, or green reflections, severe crazing occurs. The incorporation of such coated flakes in a plastic like polypropylene causes the stripping of part of the coating, with subsequent loss of reflectivity, color, and luster in the finished plastic object.

In accordance with the present invention, an aqueous coating method is provided for producing high quality oxide coatings for the production of nacreous and colored effects, and which overcomes the difficulties inherent in known prior art procedures. Such method includes the steps of forming a solution of a hydrogen peroxide complex of the metal and then hydrolyzing such complex to the desired metal oxide with the decomposition of the complex. By placing the solution in contact with a surface to be coated and thus effecting the complex decomposition a film of the desired oxide is deposited upon such surface.

The reaction herein contemplated goes essentially to completion because the complexing substance, hydrogen peroxide, decomposes under the conditions of the coating reaction. The procedure of this invention permits the deposition of thicker coatings of the metal oxide, capable of producing, in the case of titanium dioxide coatings, second red colors by a single application without encountering crazing during the crystallization state.

Moreover, the coatings thus produced may be incorporated as flakes in a plastic like polypropylene without stripping of the coating, and are therefore capable of yielding the maximum in color reflectivity and luster. The coating method hereof may also be used to produce thinner nacreous white reflecting coatings.

The metal oxide coatings produced in accordance with the invention may be formed upon relatively large objects or on small particles. The surfaces may be those of glass, ceramics, mica, plastics, and resinous substances, the latter two groups including cellulose nitrate, cellulose acetate, ethyl cellulose, methyl methacrylate, polyester resins, epoxy resins, phenol formaldehyde resins, urea formaldehyde resins, etc. For the purpose of illustrating a preferred embodiment of the present method, without however, limiting the scope of the invention thereto, the following description will refer to the coating of relatively small particles, e.g., mica flakes, which can be readily held in suspension in the coating solution.

In the following description, the invention will be principally described in connection with the formation of titanium dioxide reflective surfaces; it will be understood, however, that the present invention includes within its scope the production of reflective products constituted of the oxide of any metal which complexes with hydrogen peroxide, and which produces an oxide of high refractive index, e.g., above 1.8. Examples of such oxides are $TiO_2$, $ZrO_2$, $CeO_2$, $MbO_3$, and $V_2O_5$.

The source of the high index film-forming oxide may, in the case of a $TiO_2$ film, be titanium sulfate, titanium tetrachloride, or other titanium compounds which form a water-soluble hydrogen peroxide complex which can be hydrolyzed to $TiO_2$. Since titanium sulfate and titanium tetrachloride are the most economical sources of titanium metal, the majority of the examples set forth hereinafter are based on the use of such compounds. Other compounds which form the desired hydrogen peroxide complex and which are hydrolyzable to the corresponding film forming oxide with the decomposition of the complex, in accordance with the present invention, include basic titanium sulfate, titanium tetrabromide, zirconium tetrachloride, zirconium tetrabromide, zirconium sulfate, zirconyl chloride, zirconyl bromide, zirconyl iodide, basic ceric nitrate, ceric sulfate, molybdenum trioxide, molybdenum oxytetrachloride, and divanadyl trisulfate.

The coating solution of the present invention is prepared by dissolving the titanium, zirconium or other metal compound in a hydrogen peroxide solution, or by adding hydrogen peroxide to an aqueous solution of such compound. The concentration of the metal in the resulting solution, calculated as the oxide, may range from about 0.2 to 6.0% by weight. The concentration of hydrogen peroxide therein falls within the range of from about 0.2 to 10 moles of hydrogen peroxide per mole of metal oxide.

The solutions of such salts as titanium tetrachloride and titanium sulfate are highly acidic, so acidic, in fact, that the hydrogen ion concentration may be off the pH scale. The coating may be applied from such highly acidic solutions, which of course require appropriate process equipment, e.g. glass-lined or high-nickel alloy vessels.

If, however, equipment limitations make such high acidity undesirable, the solution may be partially neutralized by the addition of an alkaline substance to establish a pH value between about 0 and 3, preferably between about 0.3 and 1.5. Acidity may be reduced, for example, by the addition of ammonium carbonate, bicarbonate or hydroxide, or an alkali metal carbonate, bicarbonate or hydroxide, for example.

There are advantages in the use of a coating solution which has not been thus partially neutralized. Without neutralization, the preferred concentration range in the case of titanium, for example, is from about 2.0 to 4.0% expressed as $TiO_2$. The preferred concentration is lower when partial neutralization is used, from about 1.0 to 2.5%, expressed as the metal oxide.

When the neutralization is omitted, the preferred range of hydrogen peroxide concentration is from about 0.2 to 2.5 moles $H_2O_2$ per mole metal oxide (corresponding to from about 0.2 to 4.3% anhydrous $H_2O_2$ by weight in the preferred range of metal concentration). When the partial neutralization is utilized, the preferred range is from about 1.0 to 5.0 moles $H_2O_2$ per mole metal oxide.

The procedure from which the partial neutralization is omitted is, as may be seen from these figures, more economical in hydrogen peroxide utilization and is more convenient when it is preferred to operate at a higher metal oxide concentration. On the other hand, when it is desired to work at a relatively low metal oxide concentration, as when the total surface to be coated is relatively small, there are advantages in the lower concentrations of the preferred range of metal concentration in the partial neutralization procedure.

The partial neutralization step may be viewed as producing a certain amount of salt such as ammonium chloride or ammonium sulfate. In some instances, especially those in which the metal concentration is near the lower end of the range specified above, it may be desirable to introduce additional salt.

The deposition of the hydrated metal oxide on the substrate occurs on the application of heat, whether or not the coating solution employed has been partially neutralized. The hydrogen peroxide complexes are stable at room temperatures and slightly above, but decompose at elevated temperatures, permitting metal to be released and forming the hydrated oxide which deposits in a smooth and regular manner to form a smooth film on available substrates.

It has been found, particularly when titanium dioxide films are deposited by the preferred procedure involving direct heating of the highly acidic solution produced by dissolution of the metal compound in a hydrogen peroxide solution, that even second red colors may be produced by a single film deposition from the hydrogen peroxide solution. Employing multiple depositions, it is of course possible to produce thicker films having higher second or third colors.

The present invention will be more fully understood from a consideration of the following examples of preferred embodiments thereof.

Example I.—Nacreous coating prepared from
$TiOSO_4$—$H_2O_2$

A titanium sulfate solution (conveniently referred to as $TiOSO_4$, even though the solutions described contain an excess of sulfuric acid) was prepared containing the equivalent of 10% $TiO_2$ and a total sulfate concentration equivalent to 25% $H_2SO_4$. To 31 parts of this solution were added 4.3 parts of 30% $H_2O_2$ and 65 parts of water, the solution then totaling 100 parts.

The titanium content of the completed solution was equivalent to 3.1% $TiO_2$ and the total sulfate concentration to 7.55% $H_2SO_4$. The pH value was off-scale, i.e., less than zero.

Mico flakes (12.4 parts of a 325-mesh water ground white muscovite mica whose surface area was about 4 square meters per gram) were added to the solution and were maintained in suspension with agitation.

The suspension was brought rapidly to a boil, and then refluxed for two hours. The coated mica flakes were collected by filtration and were washed with water. They were dried at 110° C. and were seen to have a yellow reflection color. The color was readily demonstrated by placing either the wet or dry flakes on a black glass plate, where they glinted with a metallic gold luster. After calcining at 900° C. for two hours, the flakes had a white pearl reflection color. X-ray diffraction of the calcined product revealed that the $TiO_2$ was in the form of anatase.

Coatings thus produced were smooth and free from crazing following the calcination. The flakes displayed bright luster in nitrocellulose films and were incorporated in polypropylene without stripping of the coating, employing the following procedure:

Polypropylene molding powder (400 grams) was fluxed in a small Banbury mill at 290° F. The coated mica (5 grams) and 100 grams of additional polypropylene molding powder were then added, and dispersion effected with a total forward mixing time of 5 minutes. The pressure on the ram was 30 pounds per square inch.

The uniform mass was discharged from the mill. A small portion was pressed into a pancake for visual and microscopic examination. Alternatively, the mica-containing polypropylene may be granulated and used as a molding powder for the preparation of injection molded test pieces.

The pancakes and injection molded step chips were seen to have a white pearl luster. Examination of the polypropylene articles by reflection microscopy at 1000× showed that the coating on the mica flakes was intact, demonstrating the high degree of adhesion of the coating.

Example II.—Gold reflecting coating prepared from
$TiOSO_4$—$H_2O_2$

The procedure of Example I was repeated except that 6.2 parts of mica flakes were used instead of the 12.4 parts employed in Example I. After calcining at 900° C. for two hours, the flakes exhibit a bright gold reflection color.

Example III.—Green reflecting coating prepared from
$TiOSO_4$—$H_2O_2$

The procedure of Example I was repeated employing 3.1 parts of mica flakes. After calcining the flakes exhibited a bright green reflection color.

Example IV.—Second red reflecting coating prepared from $TiOSO_4$—$H_2O_2$

The procedure of Example I was again repeated employing 2.1 parts of mica flakes. After calcining, flakes exhibited a bright second red reflection color.

In each of Examples II to IV inclusive, the coatings were smooth and free from crazing. Following the calcination the products displayed bright colors in nitrocellulose films and could be incorporated in plastic such as polypropylene employing the procedure described in Example I without stripping of the coating.

In contrast, a green-reflecting coating prepared by the previously known $TiOSO_4$—$H_2SO_4$ procedure showed severe craze marks when examined microscopically; incorporation in polypropylene by the procedure of Example I resulted in a nonpearly step chip. The microscope revealed almost complete stripping of the coating from incorporated platelets. Indeed, even thinner coatings which reflected first magenta, i.e., first red, when made by the previously known $TiOSO_4$—$H_2SO_4$ procedure, revealed craze marks and a high degree of stripping of the coating on incorporation in polypropylene.

Example V.—Nacreous coating prepared from
$TiCl_4$—$H_2O_2$ solution

A $TiCl_4$—$H_2O_2$ stock solution was prepared as follows: To 63.6 parts of water were added 13.7 parts of 30% $H_2O_2$ solution. To the solution were then added 22.7 parts $TiCl_4$, making the total 100 parts. The stock solution thus contained 4.1% $H_2O_2$ and 22.7% $TiCl_4$ (equivalent to 9.56% $TiO_2$), all percentages being by weight.

It was convenient to add the $TiCl_4$ subsurface, in order to prevent fuming, and the solution was cooled during the addition to keep the temperature below 30° C. The solution was strongly acidic.

To 36.6 parts of this solution were added 63.4 parts of water, producing a solution equivalent to 3.5% $TiO_2$ and 1.5% $H_2O_2$.

Mica flakes (14 parts) were added to the solution and were kept in suspension by adequate agitation.

The suspension was brought rapidly to a boil, and then refluxed for 1 hour. The coated mica flakes were collected by filtration and were washed with water. After drying at 110° C., they were seen to have a yellow reflection color; after calcining at 900° C. for 2 hours, the flakes had a bright pearl reflection color.

Example VI.—Nacreous coating prepared from
$ZrCl_4$—$H_2O_2$ solution

To 83.3 parts of water were added 5.0 parts of 30% $H_2O_2$ followed by 11.7 parts $ZrCl_4$. The solution thus contained 11.7% $ZrCl_4$, equivalent to 6.2% $ZrO_2$, and 1.5% $H_2O_2$.

Mica (15.1 parts) was added and was kept in suspension by adequate agitation.

The solution was rapidly heated to the boiling point, and was refluxed for 45 minutes. The coated mica flakes were collected by filtration and were washed with water. They were dried at 110° C., and calcined at 700° C. for 1 hour. The calcined flakes had a bright pearl reflection color.

Example XII.—Nacreous coating from $TiOSO_4$—$H_2O_2$, partial neutralization

A stock solution of $TiOSO_4$ in excess sulfuric acid was prepared containing 7.44 parts $TiO_2$ and 18.6 parts $H_2SO_4$ per 123 parts total solution, all parts being by weight.

To 72.8 parts of this stock solution were added 22.6 parts of 30% $H_2O_2$, 100 parts water, and sufficient $NH_4HCO_3$ powder (approximately 7.6 parts) to bring the pH value to about 0.7 to 0.9. The solution was then made up to a total of 212.1 parts with additional water.

Mica flake (18 parts) were then added. The suspension was heated to the boiling point in 60 minutes, and maintained at the boil for 3 minutes longer. The deep red color of the titanium peroxide complex at this point changed to light orange, and the mica flakes acquired a golden reflection color.

The coated mica flakes were permitted to settle, and the supernate decanted. The flakes were filtered and washed with water until free of salt. They were dried at 110° C.

The flakes were calcined at 900° C. for 2 hours, and the previously amorphous, hydrated coating crystallized and shrunk to a thickness which gave a whitish nacreous reflection. Microscopic examination of the calcined flakes at about 1000× showed that the coating was smooth and free from crazing.

The thus calcined flakes were incorporated in polypropylene by the procedure described in Example I and the product pancakes and injection-molded special chips were found to exhibit a uniform craze-free white pearl luster.

Example VIII.—Gold reflecting coating from
$TiOSO_4$—$H_2O_2$, partial neutralization The procedure of Example VII was followed, except that 10 parts of mica flake were used instead of 18 parts. At the conclusion of the reaction the mica flakes had acquired a coating with a blue reflection. After 2 hours at 900° C. the flakes had a strong gold reflection. Microscopic examination disclosed evenly coated flakes free of crazing.

Incorporation in polypropylene by the procedure of Example I gave a step chip with golden pearl luster. The chip had a bluish color when seen by transmitted light. Observation by reflection microscopy revealed that the coating was adherent and had resisted stripping.

Example IX.—Magenta reflecting coating from
$TiOSO_4$—$H_2O_2$ solution, partial neutralization The procedure of Example VII was followed except that the quantity of mica was reduced to 9 parts. After 2 hours at 900° C., the flakes have a magenta reflection. The microscope revealed that the coating is uniform, without crazing.

The step chip derived from incorporation in polypropylene by the procedure of Example I had a red pearl luster. When examined by transmitted light, it had a greenish appearance. Microscope examination showed that the coating was adherent and nonstripping.

In contrast, a magneta-reflecting coating prepared by the previously known $TiOSO_4$—$H_2SO_4$ procedure showed craze marks when examined microscopically, and a high degree of stripping of the coating after incorporation in polypropylene by the procedure of Example I. Polypropylene step chips had poor luster and low color intensity.

Example X.—Green Reflecting coating from
$TiOSO_4$—$H_2O_2$, partial neutralization The procedure of Example VII was followed, except that only 4.5 parts of mica flakes were used. A green-reflecting product was obtained after calcining at 900° C. Microscopic examination showed only occasional craze lines.

Incorporation in polypropylene produced a green pearl step chip, which appeared reddish by transmitted light. The microscope disclosed that the coating had not stripped during the incorporation procedure.

Example XI.—Green reflecting coating from
$TiOSO_4$—$H_2O_2$,
partial neutralization, double coat procedure The calcined gold reflecting procedure of Example VIII was used as the starting material for another coating operation. The gold product (14 parts) was recoated with 200 parts of the coating solution described in Example VII. After calcining, a green-reflecting flake was obtained. The microscope showed complete freedom from crazing. A polypropylene step chip had a brighter green luster than that of Example X, and was similarly entirely free of stripping.

Example XII.—Second red coating prepared from
$TiOSO_4$—$H_2O_2$,
partial neutralization, triple coat procedure The green reflecting flakes (18.9 parts) of Example XI were recoated with 115 parts of the coating solution of Example VIII. After calcining at 900° C. once again, a red reflecting coating was obtained, corresponding to second red. The product was free of crazing, and withstood incorporation in polypropylene without difficulty.

A unique distinction between the second red step chip of this example or of Example IV and the first magenta or red of Example IX is observed when the two products are seen by means of light at various angles of incidence. At perpendicular incidence, both step chips appear red by reflection. As the angle of incidence departs from the perpendicular, the first red of Example IX shows a slight shift in color toward lower wavelength, i.e., the reflection appears golden orange. The second red of this example, however, shifts through orange and gold to green.

Example XIII.—Nacreous coating prepared from
$TiCl_4$—$H_2O_2$, partial neutralization A $TiCl_4$—$H_2O_2$ stock solution was prepared as follows: To 300 parts of water were added 64.5 parts of 30% $H_2O_2$ solution. To the solution were then added 31.5 parts $TiCl_4$. It was convenient to add the $TiCl_4$ subsurface, in order to prevent fuming, and the solution was cooled during the addition to keep the temperature below 30° C. The pH value was raised to 0.5 to 0.6 with $(NH_4)_2CO_3$; from 18 to 20 parts were required. It was convenient to add the carbonate in the form of a 20% solution. Finally, the pH-adjusted solution was made up to 520 parts with water.

The reaction mixture was prepared by combining 260 parts of stock solution, 30 parts of mica flake, and enough water to make 650 parts. The solution contained 2.2% (as $TiO_2$) titanium.

The suspension was heated rapidly to the boiling point (approximately 15–20 minutes), and held at the boil for 1–2 minutes. The coated flakes were separated by filtration, and washed with water till free of salt. The product was dried at 110° C., and then calcined for two hours at 900° C. X-ray diffraction revealed that the $TiO_2$ coating was primarily in the form of anatase.

The coated flakes had a pearly or silvery appearance. The microscope showed that the coating was smooth and uncrazed. Incorporation in polypropylene by the method of Example I yielded a mother-of-pearl-like polypropylene step chip in which the coating on the mica flakes remained intact.

Example XIV.—Gold reflecting coating from $TiCl_4$—$H_2O_2$, partial neutralization The procedure of Example XII was followed, except that, when the solution reached the boil, the remaining 260 parts of cold stock solution were added rapidly to the boiling solution. The solution was rapidly brought back to boiling temperature, and held there for approximately 4–5 minutes. The calcined flakes had a gold color when viewed by reflection.

The microscope revealed a smooth, uncrazed coating. Polypropylene incorporation by the procedure of Example I demonstrated that the coating was adherent and non-stripping.

Example XV.—Gold reflecting coating prepared from $ZrCl_4$—$H_2O_2$, partial neutralization To 100 parts of water were added 13.3 parts of 30% $H_2O_2$ solution. To the solution were then added 19 parts $ZrCl_4$; the solution was kept below 30° C. The pH value was raised to 1.0 with 20% $(NH_4)_2CO_3$ solution. Enough water was added to bring the total to 200 parts, and 11.4 parts of mica flake were then added.

The suspension was rapidly heated to the boiling point, and was held at the boil for 15 minutes. The coated flakes were separated by filtration, and were washed with water until free of salt. The product was calcined at 700° C. for one hour.

As indicated in the preceding examples, a single coating can, when partial neutralization of the treating solution is not employed, produce a noncrazing film thick enough to provide a second red reflection. Alternatively, when partial neutralization is employed a single coating may produce a noncrazing film thick enough to give a green reflection (Example X) or a multiple coat procedure may be utilized to produce second colors, e.g., as illustrated in Example XII.

It will be understood that the reflection color obtained from an interference film depends on the angle of observation. The color corresponds to a maximum wavelength when the observation is made with light perpendicularly incident on the film and perpendicularly reflected. The angle of incidence, which is the angle between the incident ray and the normal to the reflecting surface, is then 0°.

As the angle of incidence and the angle of reflection increases from 0°, the color of the reflection shifts toward lower wavelength. A first green reflection appears blue, a first blue appears purple, and a first red appears yellow at higher angles of incidence. A first yellow seems to lose its color when observed at higher angles of incidence.

Second colors undergo much more dramatic color shifts when viewed at higher angles of incidence. Second yellow, for example, goes to green and then blue with increasing angle; second red passes through yellow to green; and second green passes through blue and purple to red.

Mica flakes coated with films producing second colors are capable of showing a variety of colors simultaneously, if they are coated on an undulating surface. Furthermore, they may be cast in plastics in an undulating pattern, to make possible the simultaneous observation of several colors. In this way, an effect of true iridescence can be produced.

Second colors of high quality, an illustration of which is given in Example IV, can also be deposited with multiple coats from peroxide solution. A spectacular shift of color with angle is observed. If films which reflect second colors are built up by means of multiple coats from the previously known titanium sulfate-sulfuric acid procedure, the uniformity is poor. The films deviate too greatly from ideal interference film to permit a substantial shift in color to be seen with changing angle of incidence.

Although this invention has been described with respect to preferred embodiments thereof, it should be understood that many variations and modifications will now be obvious to those skilled in the art.

The embodiments of the invention in which an exclusive privilege or property is claimed are defined as follows.

We claim:
1. A method of coating the surface of ceramic, mica, plastic, or lacquer or resin-coated particles with a film-forming metal oxide of titanium, zirconium, cerium, molybdenum or vanadium, which comprises forming a solution of a water-soluble hydrogen peroxide complex from the compounds of the corresponding metal, said solution containing from 0.2 to 6.0% by weight of the metal, calculated as the oxide, and from 0.2 to 10 moles of hydrogen peroxide per mole of metal oxide; placing said solution in contact with the surface to be coated; and then, with the decomposition of the complex, hydrolyzing said solution so as to deposit a film of said oxide on said substrate.

2. The method of claim 1 which comprises heating the solution so as to effect hydrolysis thereof upon the decomposition of the complex and to deposit a film of said oxide on said surface.

3. The method of claim 1 wherein the metal compound is selected from the group consisting of titanium tetrachloride, titanium sulfate, titanium tetrabromide, zirconium tetrachloride, zirconium tetrabromide, zirconium sulfate, zirconyl chloride, zirconyl bromide, zirconyl iodide, basic ceric nitrate, ceric sulfate, molybdenum trioxide, molybdenum oxytetrachloride, and divanadyl trisulfate.

4. A method according to claim 1 wherein the surface to be coated is a glass surface.

5. The method of claim 2 wherein the surfaces to be coated are the surfaces of small particles.

6. The method of claim 3 in which the coating is applied to mica flakes.

7. The method of claim 5, in which said solution contains from 2.0 to 4.0% by weight, expressed as $TiO_2$, of a titanium salt and from 0.2 to 2.5 moles of hydrogen peroxide per mole of metal oxide, the acidity of such solution being so great as to be below the pH scale, and in which said solution is placed in contact with the mica particles to be coated without partial neutralization.

8. The method of claim 5 wherein the particles are mica particles.

9. The method of claim 8 wherein the metal oxide is titanium dioxide.

10. The method of claim 9 wherein the titanium compound is selected from the group consisting of titanium tetrachloride and titanium sulfate and calcining the coated surface to crystallize $TiO_2$ therefrom.

11. The method of claim 10 in which the acidity of the hydrogen peroxide solution is so great as to be below the pH scale.

12. The method of claim 10 in which the pH of the hydrogen peroxide solution is adjusted to a value within the range of from 0 to 3.

(References on following page)

References Cited

UNITED STATES PATENTS

| | | | |
|---|---|---|---|
| 2,941,895 | 6/1960 | Haslam | 106—193 |
| 3,071,482 | 1/1963 | Miller | 117—159 X |
| 3,087,828 | 4/1963 | Linton | 117—159 X |
| 3,087,829 | 4/1963 | Linton | 117—100 X |

WILLIAM D. MARTIN, *Primary Examiner.*

U.S. Cl. X.R.

117—72, 123, 124, 138.8, 159, 169